US007517003B2

(12) United States Patent
Okada et al.

(10) Patent No.: US 7,517,003 B2
(45) Date of Patent: Apr. 14, 2009

(54) OPENING AND CLOSING APPARATUS FOR OPENING AND CLOSING BODY OF VEHICLE

(75) Inventors: Hiroshi Okada, Yokohama (JP); Nao Mizumoto, Kanagawa (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 294 days.

(21) Appl. No.: 11/480,924

(22) Filed: Jul. 6, 2006

(65) Prior Publication Data

US 2007/0046065 A1 Mar. 1, 2007

(30) Foreign Application Priority Data

Aug. 23, 2005 (JP) ............................ 2005-241241

(51) Int. Cl.
*B60J 5/00* (2006.01)

(52) U.S. Cl. ............. 296/146.8; 296/146.1; 296/146.11

(58) Field of Classification Search ............. 296/146.1, 296/147, 146.8, 146.11
See application file for complete search history.

(56) References Cited

U.S. PATENT DOCUMENTS 6,382,706 B2 * 5/2002 Yuge et al. ............... 296/146.4
6,405,486 B1 * 6/2002 Rogers et al. ............ 296/146.8
6,814,392 B1 * 11/2004 Tomaszewski ........... 296/146.4
6,834,463 B2 * 12/2004 Fukumoto et al. ........ 296/146.8
6,929,310 B2 * 8/2005 Okada ..................... 296/146.8
6,955,390 B2 * 10/2005 Rigorth et al. ........... 296/146.4

FOREIGN PATENT DOCUMENTS

JP 2003-276441 A 9/2003

* cited by examiner

*Primary Examiner*—Lori L Lyjak
(74) *Attorney, Agent, or Firm*—Foley & Lardner LLP

(57) ABSTRACT

An opening and closing apparatus for an opening and closing body of a vehicle. The opening and closing apparatus includes a reciprocating member movable along a plane perpendicular to a hinge shaft. A connecting member is provided having a first end section fixed to the opening and closing body, and a second end section pivotally attached to the reciprocating member through a connecting shaft. The opening and closing body is moved to open and close through the connecting member upon a movement of the reciprocating member. In the opening and closing apparatus, the connecting member includes two side wall sections apart from each other in a direction parallel with the axis of the connecting shaft. A suppression member is disposed to a stationary body in the vehicle and so engaged between the two side wall sections as to be relatively movable to the connecting member.

8 Claims, 5 Drawing Sheets

OPENING AND CLOSING APPARATUS FOR OPENING AND CLOSING BODY OF VEHICLE

BACKGROUND OF THE INVENTION

This invention relates to improvements in an opening and closing apparatus for an opening and closing body of a vehicle which apparatus is arranged such that the opening and closing body pivotally attached to a vehicle body so as to be movable to open and close with power of a motor.

A conventional opening and closing apparatus is disclosed in Japanese Patent Provisional Publication No. 2003-276441. In this conventional opening and closing apparatus, an opening and closing apparatus for an opening and closing body of a vehicle is arranged such that a rear gate pivotally attached to a rear part of a vehicle body so as to be movable to open and close with power of a motor disposed inside a vehicle roof. Further, a rack reciprocable by power of the motor is connected to a rear gate through a plate-shaped connecting member, so that reciprocation of the rack is transmitted to the rear gate thereby opening and closing the rear gate.

SUMMARY OF THE INVENTION

However, drawbacks have been encountered in the above conventional opening and closing apparatus. Specifically, in the above opening and closing apparatus, the connecting member is sometimes deflected or deformed in a direction generally perpendicular to a longitudinal direction (or in a lateral direction) when the rear gate is manually moved to close or electrically moved to open by the motor in a condition where the connecting member is insufficient in strength. This provides a fear that the rear gate makes impossible its smooth open and close actions, and therefore it is necessary to increase the thickness of the connecting member in order to increase the strength of the connecting member. However, with such an arrangement, the connecting member is largely increased in weight, which is not preferable from the view point of energy-saving.

In view of the above problems, an object of the present invention is to provide an improved opening and closing apparatus for an opening and closing body of a vehicle which apparatus can effectively overcome drawbacks encountered in conventional opening and closing apparatuses.

Another object of the present invention is to provide an improved opening and closing apparatus for an opening and closing body of a vehicle which apparatus is so arranged as to be excellent in strength without increasing the thickness of a connecting member for connecting a reciprocating member to the opening and closing body, allowing smooth open and close actions of the opening and closing body.

Further object of the present invention is to provide an improved opening and closing apparatus for an opening and closing body of a vehicle which apparatus has the connecting member which is prevented from its lateral deflection even though the thickness of the connecting member is not increased.

According to the present invention, an opening and closing apparatus is for an opening and closing body of a vehicle, the opening and closing body being so supported to a vehicle body as to be movable around a hinge shaft to open and close. The opening and closing apparatus comprises a reciprocating member movable along a plane perpendicular to the hinge shaft by power of a motor disposed on a side of the vehicle body. A connecting member is provided having a first end section fixed to the opening and closing body, and a second end section pivotally attached to an end portion of the reciprocating member through a connecting shaft extended parallel with the hinge shaft. The opening and closing body is moved to open and close through the connecting member upon a movement of the reciprocating member. In this opening and closing apparatus, the connecting member further includes two side wall sections which are apart from each other in a direction parallel with axis of the connecting shaft. Additionally, a suppression member is disposed to a stationary body in the vehicle and so engaged between the two side wall sections as to be relatively movable to the connecting member.

DATAILED DESCRIPTION OF THE INVENTION

Figure 1:
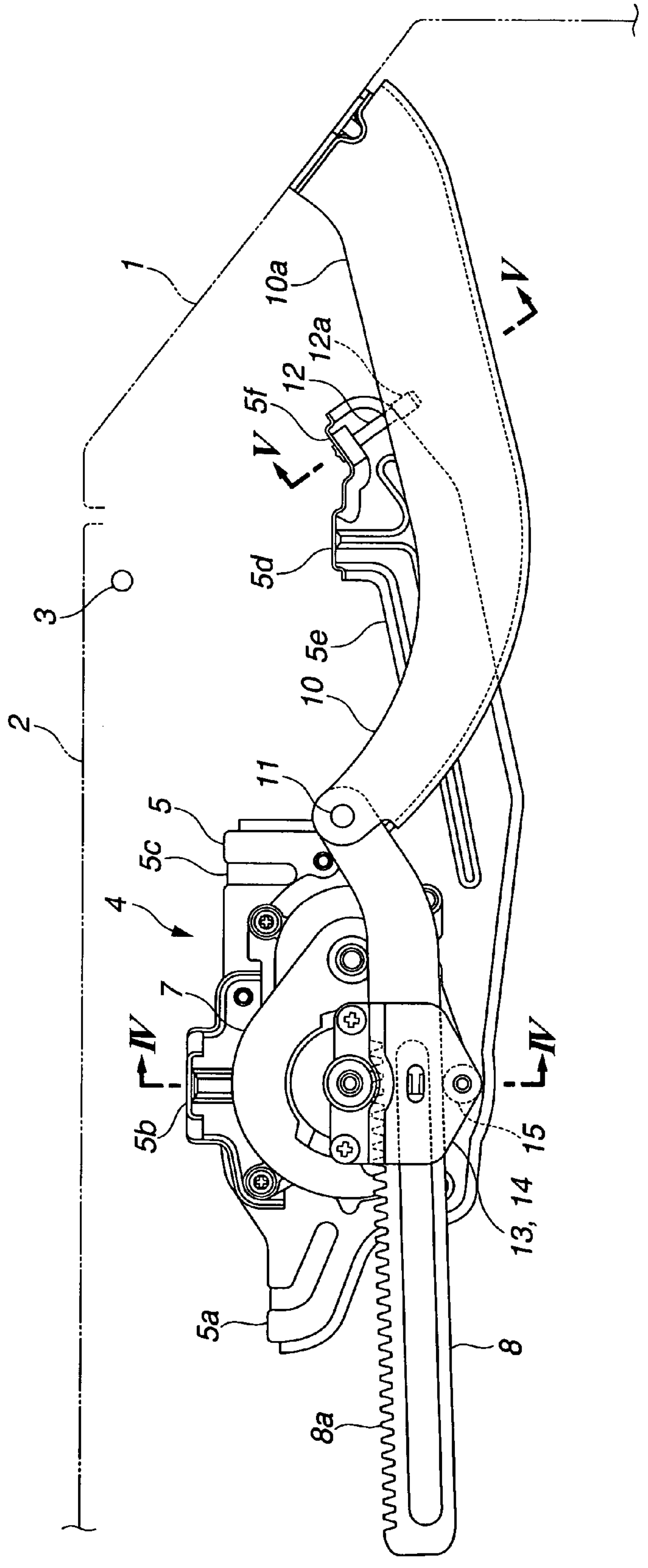
FIG. 1 is a side view of an embodiment of an opening and closing apparatus according to the present invention, showing a state where an opening and closing body is in a closed position.
Figure 2:
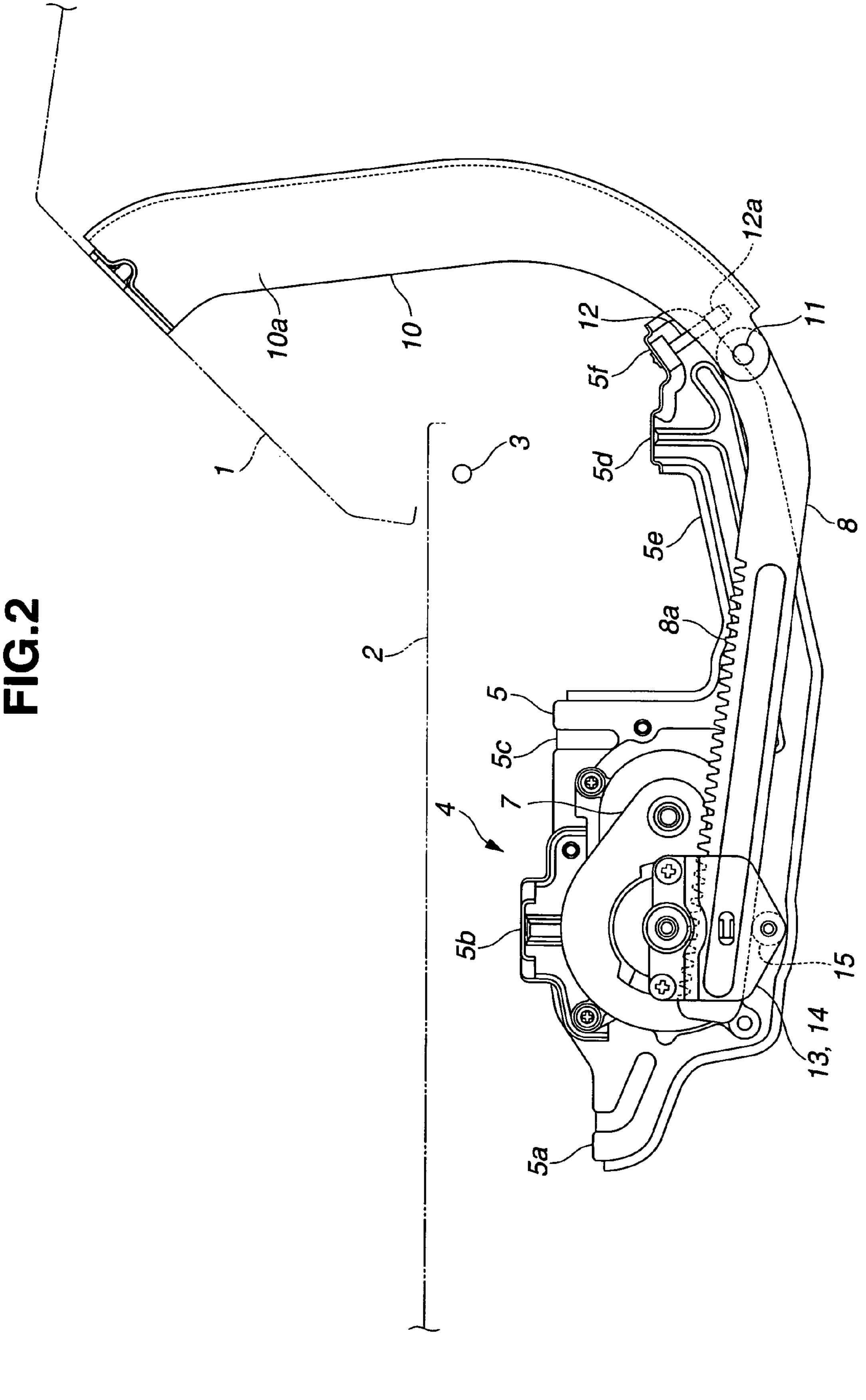
FIG. 2 is a side view similar to FIG. 1, but showing a state where the opening and closing body is in a fully opened position.
Figure 3:
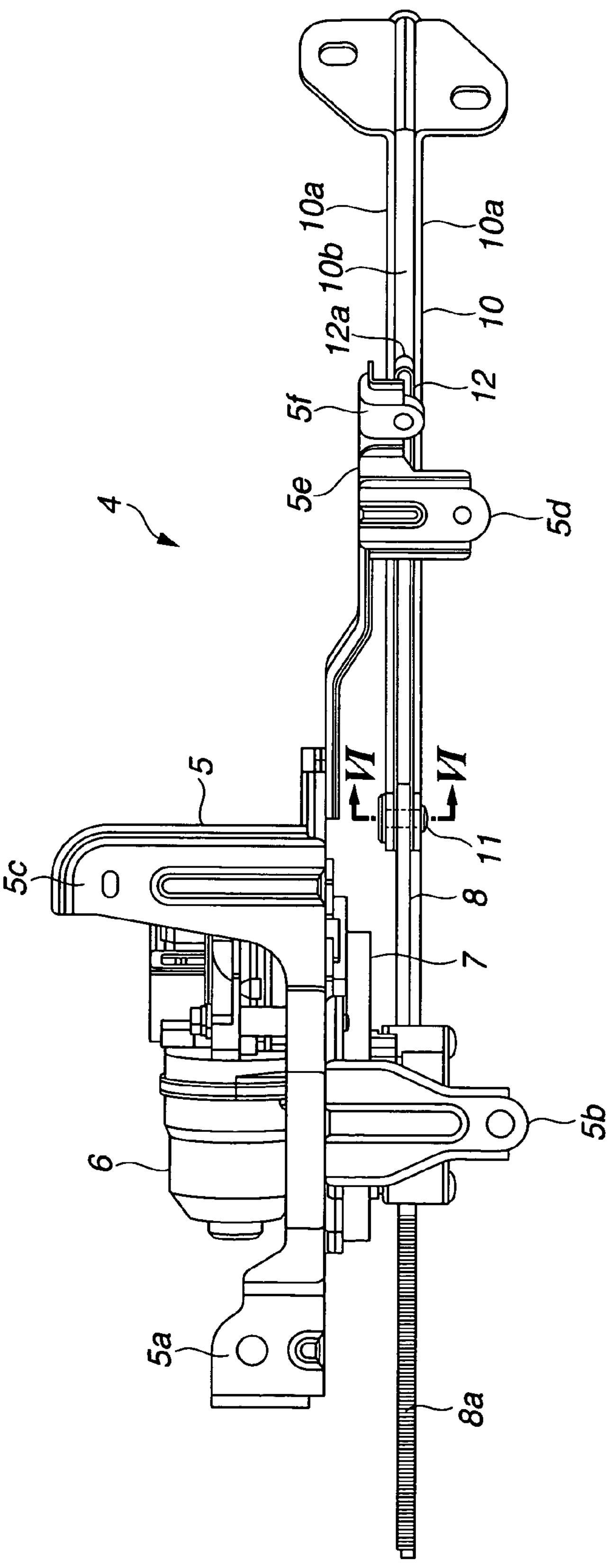
FIG. 3 is a top plan view of the opening and closing apparatus of FIG. 1.
Figure 4:
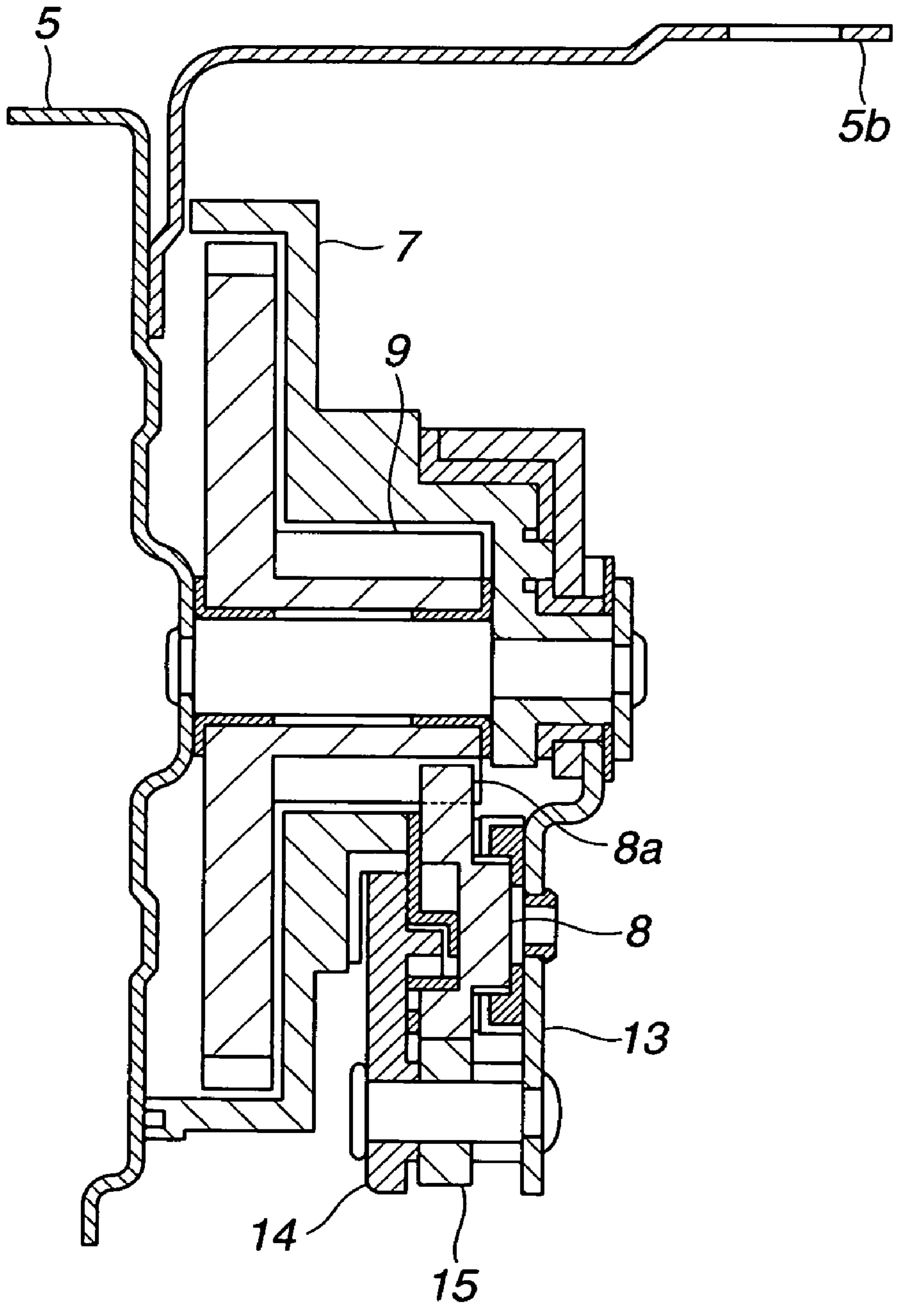
FIG. 4 is an enlarged vertical sectional view of the opening and closing apparatus of FIG. 1, taken generally along the plane indicated by lines IV-IV of FIG. 1.
Figure 5:
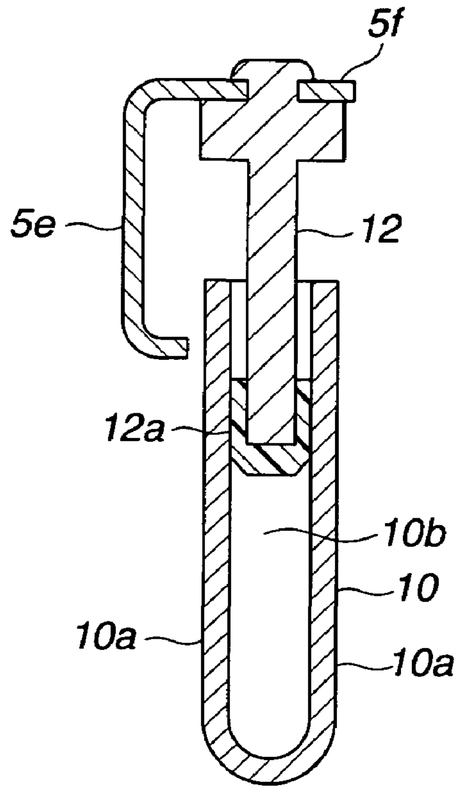
FIG. 5 is an enlarged vertical sectional view of the opening and closing apparatus of FIG. 1, taken generally along the plane indicated by lines V-V of FIG. 1.
Figure 6:
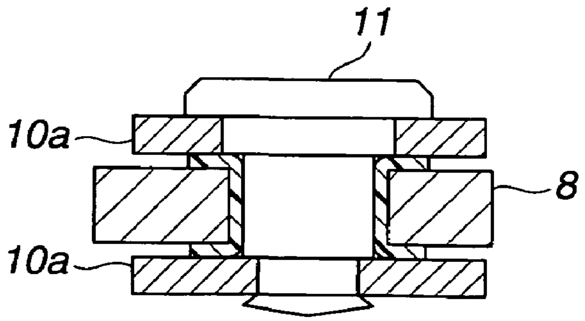
FIG. 6 is an enlarged vertical sectional view of the opening and closing apparatus of FIG. 3, taken generally along the plane indicated by lines VI-VI of FIG. 3.

Referring now to the accompanying drawings, an embodiment of an opening and closing apparatus according to the present invention will be discussed. FIGS. 1 and 2 are side views of the opening and closing apparatus according to the present invention. FIG. 3 is a top plan view of the opening and closing apparatus. FIG. 4 is an enlarged vertical sectional view taken generally along the plane indicated by lines IV-IV of FIG. 1. FIG. 5 is an enlarged vertical sectional view taken generally along the plane indicated by lines V-V of FIG. 1. FIG. 6 is an enlarged vertical sectional view taken generally along the plane indicated by lines VI-VI of FIG. 3. Additionally, the left and right in FIGS. 1 to 3 are respectively referred to "forward" and "rearward" in the following description.

The opening and closing apparatus includes a rear gate 1 serving as an opening and closing body. The rear gate 1 is pivotally attached to a rear end part of a roof panel 2 forming a part of a vehicle body of an automotive vehicle, through a hinge shaft 3 extended in a vehicle width direction (or in a vertical direction in FIG. 3) in such a manner as to be upwardly and downwardly movable around the hinge shaft 3 so as to be opened and closed. The rear gate 1 is movable to be opened and closed when manually operated or electrically operated by an opening and closing apparatus 4 disposed inside the roof panel 2.

The opening and closing apparatus 4 further includes a motor 6 rotatable both in normal and reverse directions. A casing 7 houses a reduction gear 9 (shown in FIG. 4) for reducing a rotational speed of the motor 6, and an electromagnetic clutch (not shown) capable of completing and breaking a power transmission path between the reduction gear 9 and the motor 6. A rack 8 serves as a reciprocating member reciprocable (or capable of reciprocating) in a fore-and-aft direction of the automotive vehicle (or along an imaginary plane perpendicular to the hinge shaft 3). A connecting link 10 serves as a connecting member for connecting the rack 8 to the rear gate 1. These parts 6 to 10 are supported to the roof panel 2 through a support bracket 5 serving as a stationary body.

The rack 8 has at its upper edge part a teeth portion 8*a* engaged with the reduction gear 9. Left and right side supporting plates 13 and 14 are supported at a side surface of the casing 7 forming a part of the support bracket 5 in such a manner as to be swingable in the fore-and-aft direction. A roller 15 is rotationally attached between the left and right side supporting plates 13 and 14. The rack 8 is supported reciprocable in the fore-and-aft direction onto the roller 15 while being located between the left and right side supporting plates 13 and 14, so as to be adapted to reciprocate between a closed position as shown in FIG. 1 and an opened position where the rack 8 is moved rearward from the closed position by power of the motor 6 as shown in FIG. 2.

The connecting link 10 is formed by bending a plate material to be generally U-shaped in section as shown mainly in FIG. 5, and additionally has left and right side wall sections 10*a*, 10*a* which are apart from each other in the axial direction of the hinge shaft 3 (or in a horizontal direction in FIG. 5).

A front end section of the connecting link 10 is pivotably connected to a rear end portion of the rack 8 through a connecting shaft 11 extended in the same direction as the axis of the hinge shaft 3 (or in the vehicle width direction). A rear end section of the connecting link 10 is fixed to the rear gate 1 with a bolt (not shown). Therefore, with the movement of the rack 8, the connecting link 10 is moved between the closed position as shown in FIG. 1 and the opened position where the rear gate 1 is pivotally moved upward around the hinge shaft 3 as shown in FIG. 2. Further, the rear end portion of the rack 8 is pivotally attached through the connecting shaft 11 in a condition of being held between the two side wall sections 10*a*, 10*a* disposed at the front end section of the connecting link 10. Such a connection between the connecting link 10 and the rack 8 causes the connecting link 10 to be securely connected to the rack 8.

The support bracket 5 has a plurality of installation pieces 5*a* to 5*d* fixed to the roof panel 2 with bolts (not shown). An extending portion 5*e* of the support bracket 5 extends rearward generally along a side surface of the rack 8. The extending portion 5*e* has at its rear end portion a bent piece 5*f* extended in the vehicle width direction. An upper end portion of a metallic cylindrical or columnar suppression member 12 which protrudes rearward and diagonally downward is fixedly attached to the bent piece 5*f*. Further, the rearmost installation piece 5*d* of the support bracket 5 is disposed in the vicinity of the bent piece 5*f*, i.e., in the vicinity of the suppression member 12. Since a part connected and located in the vicinity of the suppression member 12 is thus fixed by the installation piece 5*d* to the roof panel 2, i.e., to the vehicle body, the suppression member 12 can be improved in supporting strength and locational accuracy.

The suppression member 12 is engaged with a guide groove 10*b* formed between the two side wall sections 10*a*, 10*a* of the connecting link 10 and extended in the fore-and-aft direction so as to prevent the connecting link 10 from deflection in a lateral direction. Therefore, the suppression member 12 is located between the two side wall sections 10*a*, 10*a* and relatively moved forward and rearward to the connecting link 10 with the movement of the connecting link 10. Moreover, the suppression member 12 has a slidably contacting portion 12*a* which is formed by coating a lower portion of the suppression member 12 (i.e., a portion of the suppression member 12, engaging and sliding between the two side wall sections 10*a*, 10*a*) with a synthetic resin excellent in sliding characteristics.

In operation, when the rear gate 1 is closed, the rack 8 and the connecting link 10 are extended generally in the horizontal direction as shown in FIG. 1. Then, the sidably contacting portion 12*a* of the suppression member 12 is engaged between the two side wall sections 10*a*, 10*a* of the connecting link 10 and located relatively rearward of the connecting link 10.

When an operation switch (not shown) is operated, the power transmission path is completed by the electromagnetic clutch thereby transmitting power of the motor 6 to the rack 8. With this, the rack 8 is moved from the closed position to the opened position, so that the rear gate 1 is moved in a direction to open through the connecting link 10. At this time, the suppression member 12 is relatively moved forward to the connecting link 10 as the connecting link 10 is moved in a rearward direction while it is being engaged between the two side wall sections 10*a*, 10*a* of the connecting link 10. With this, the connecting link 10 is prevented from deflection and deformation in the lateral direction by virtue of the thus arranged suppression member 12, even if a compressive load is longitudinally applied to the connecting link 10.

Additionally, when the rear gate 1 is closed manually in a state where the electromagnetic clutch is disengaged, the suppression member 12 is relatively moved rearward to the connecting link 10 as the connecting link 10 is moved in a forward direction while it is being engaged between the two side wall sections 10*a*, 10*a* of the connecting link 10. With this, the connecting link 10 is prevented from deflection and deformation in the lateral direction by virtue of the thus arranged suppression member 12.

Technical ideas (a) to (d) disclosed in the above embodiment will be discussed together with advantages obtained thereby.

(a) An opening and closing apparatus for an opening and closing body of a vehicle, the opening and closing body being so supported to a vehicle body as to be movable around a hinge shaft to open and close, comprises a reciprocating member movable along a plane perpendicular to the hinge shaft by power of a motor disposed on a side of the vehicle body. A connecting member is provided having a first end section fixed to the opening and closing body, and a second end section pivotally attached to an end portion of the reciprocating member through a connecting shaft extended parallel with the hinge shaft. The opening and closing body is moved to open and close through the connecting member upon a movement of the reciprocating member. In the opening and closing apparatus, the connecting member further includes two side wall sections which are apart from each other in a direction parallel with axis of the connecting shaft. Additionally, a suppression member is disposed to a stationary body in the vehicle and so engaged between the two side wall sections as to be relatively movable to the connecting member.

According to the idea (a), the connecting member can be prevented from deflection and deformation by virtue of the suppression member. With this, the connecting member of the opening and closing apparatus can become excellent in strength without increasing the thickness thereof while making it possible to smoothly open and close the opening and closing body.

(b) In an opening and closing apparatus as discussed in the idea (a), the suppression member has a portion engaged between the two side wall sections of the connecting member. The portion is provided with a sidably contacting portion formed of a synthetic resin.

According to the idea (b), the suppression member can be smoothly relatively moved between the two side wall sections of the connecting member, so that the opening and closing body can be more smoothly opened and closed.

(c) In an opening and closing apparatus as discussed in the idea (a) or (b), the end portion of the reciprocating member is pivotally attached to the second end section of the connecting member through the connecting shaft and located between the two side wall sections formed at the second end section of the connecting member.

According to the idea (c), the connecting member can be securely connected to the reciprocating member.

(d) In an opening and closing apparatus as discussed in any of the ideas (a) to (c), the stationary body includes a support bracket fixed to the side of the vehicle body to support the reciprocating member to the side of the vehicle body. The support bracket has an installation piece fixed to the side of the vehicle body and located in vicinity of the suppression member.

According to the idea (d), the suppression member can be improved in installation strength and locational accuracy, so that the connecting member can be more securely prevented from its deflection and deformation.

Although the invention has been described above by reference to certain embodiments and examples of the invention, the invention is not limited to the embodiments and examples described above. Modifications and variations of the embodiments and examples described above will occur to those skilled in the art, in light of the above teachings, as described below.

(i) The opening and closing body may be a hood, a trunk lid, or a side door whose hinge shaft extended vertically, in place of the rear gate 1.

(ii) The suppression member 12 may be attached to a stationary body other than the support bracket 5.

(iii) The reciprocating member may be a link or rod reciprocable by power of the motor 6, in place of the rack 8.

(iv) The connecting link 10 may be constituted of two plate materials. In this case, the side surfaces of the plate materials facing to each other may be connected with a shaft or the like in order to reinforce both the connecting links 10, 10.

The entire contents of Japanese Patent Application P2005-241241 (filed Aug. 23, 2005) are incorporated herein by reference.

What is claimed is:

1. An opening and closing apparatus for an opening and closing body of a vehicle, the opening and closing body being so supported to a vehicle body as to be movable around a hinge shaft to open and close, the opening and closing apparatus comprising:

a reciprocating member movable along a plane perpendicular to the hinge shaft by power of a motor disposed on a side of the vehicle body; and a connecting member having a first end section fixed to the opening and closing body, and a second end section pivotally attached to an end portion of the reciprocating member through a connecting shaft extended parallel with the hinge shaft, wherein the reciprocating member and the connecting member are configured so the opening and closing body is moved to open and close through the connecting member upon a movement of the reciprocating member, wherein the connecting member includes two side wall sections which are apart from each other in a direction parallel with an axis of the connecting shaft, wherein a suppression member is coupled to a stationary body in the vehicle and is engaged between the two side wall sections such as to be relatively movable to the connecting member.

2. An opening and closing apparatus as claimed in claim 1, wherein the suppression member has a portion engaged between the two side wall sections of the connecting member, the portion being provided with a slidably contacting portion formed of a synthetic resin.

3. An opening and closing apparatus as claimed in claim 1, wherein the end portion of the reciprocating member is pivotally attached to the second end section of the connecting member through the connecting shaft and is located between the two side wall sections formed at the second end section of the connecting member.

4. An opening and closing apparatus as claimed in claim 1, wherein the stationary body includes a support bracket fixed to the side of the vehicle body to support the reciprocating member from the side of the vehicle body, wherein the support bracket has an installation piece fixed to the side of the vehicle body and located in vicinity of the suppression member.

5. An opening and closing apparatus as claimed in claim 1, wherein the suppression member coupled to the stationary body is stationary.

6. An opening and closing apparatus as claimed in claim 1, wherein the suppression member engaged between the two side wall sections of the connecting member is movable relative to the connecting member in a direction in which the connecting member is moved.

7. An opening and closing apparatus as claimed in claim 1, wherein the two side wall sections of the connecting member are formed so that the two side wall sections extend from the first end section to the second end section of the connecting member.

8. An opening and closing apparatus for an opening and closing body of a vehicle, the opening and closing body being so supported to a vehicle body as to be movable around a hinge shaft to open and close, the opening and closing apparatus comprising:

a reciprocating member movable in relation to the hinge shaft by power of a motor; and a connecting member having a first end section fixed to the opening and closing body, and a second end section pivotally attached to an end portion of the reciprocating member through a connecting shaft, wherein the reciprocating member and the connecting member are configured so the opening and closing body is moved to open and close through the connecting member upon a movement of the reciprocating member, wherein the connecting member includes two side wall sections which are apart from each other, wherein a suppression member is coupled to a stationary body in the vehicle and is engaged between the two side wall sections such as to be relatively movable to the connecting member.

* * * * *